(12) United States Patent
Arai

(10) Patent No.: US 6,895,827 B2
(45) Date of Patent: May 24, 2005

(54) TORQUE MEASURING DEVICE ASSURING TIMELY MAINTENANCE WORK

(75) Inventor: Tooru Arai, Kanagawa-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 10/735,463

(22) Filed: Dec. 12, 2003

(65) Prior Publication Data

US 2004/0139807 A1 Jul. 22, 2004

(30) Foreign Application Priority Data

Jan. 16, 2003 (JP) ........................................ 2003-007876

(51) Int. Cl.$^7$ ................................................ G01L 3/14
(52) U.S. Cl. ............................. 73/862.324; 73/862.325
(58) Field of Search ...................... 73/862.324, 862.325, 73/862.338

(56) References Cited

U.S. PATENT DOCUMENTS

| | | | |
|---|---|---|---|
| 4,767,925 A | | 8/1988 | Kawamoto |
| 4,887,900 A | * | 12/1989 | Hall ............................ 356/464 |
| 5,155,468 A | | 10/1992 | Stanley et al. |
| 6,472,656 B2 | * | 10/2002 | Arai ...................... 73/862.321 |

FOREIGN PATENT DOCUMENTS

EP 1 170 577 1/2002

* cited by examiner

*Primary Examiner*—Edward Lefkowitz
*Assistant Examiner*—Lilybett Martir
(74) *Attorney, Agent, or Firm*—Fay, Sharpe, Fagan, Minnich & McKee, LLP

(57) ABSTRACT

A torque measuring device for a rotating body comprises: a rotary section composed of first and second flanges to be joined respectively to a driving shaft and a driven shaft, and a hollow cylinder having the first and second flanges formed respectively on both edges thereof; light emitting elements provided at an outer circumference of the rotary section and adapted to emit light according to an output from torque detectors provided at an inner circumference of the cylinder thereby generating an optical signal; a light receiving fiber to receive the optical signal from the light emitting elements; optical-electrical signal converters provided so as to face both end surfaces of the light receiving fiber, and adapted to convert the optical signal into an electrical signal; and a malfunction detector to detect malfunction of the light receiving fiber according to the electrical signal from the optical-electrical signal converter.

5 Claims, 4 Drawing Sheets

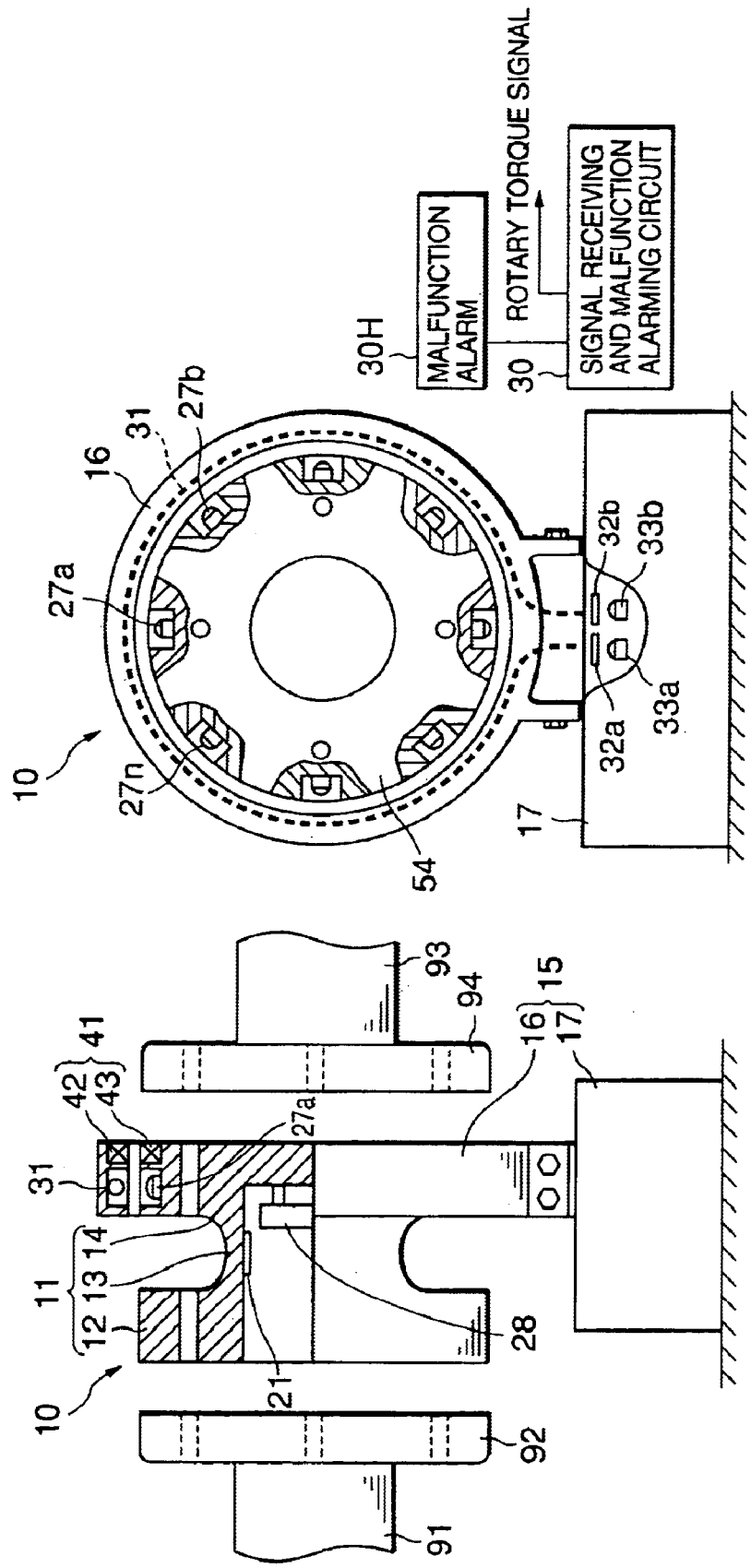

TORQUE MEASURING DEVICE ASSURING TIMELY MAINTENANCE WORK

BACKGROUND OF THE INVENTION

1. Field of the Invention

The present invention relates to a torque measuring device to measure a torque of a rotating body without contact with its rotating portion, and particularly to a torque measuring device, for which an appropriate maintenance work can be timely performed on a light receiving fiber for receiving an optical signal from the rotating body.

2. Description of the Related Art

A torque measuring device for a rotating body is set between a driving shaft powered and a driven shaft loaded and measures a rotating torque without contact with the rotating portion of a rotating body. Such a torque measuring device is disclosed in Japanese Patent Publication No. 2002-22566, which is used, for example, to measure a rotating torque between a measurement roller and a brake system in a chassis dynamo rotated by a wheel of a vehicle.

FIGS. 1A and 1B respectively show a partly cut away and cross-sectioned side view and a partly cut away front view of a conventional torque measuring device for a rotating body.

As shown in FIGS. 1A and 1B, a conventional torque measuring device for a rotating body 50 comprises: a rotary section 51 rotatably disposed between a driving shaft 91 powered and a driven shaft 93 loaded; and a stationary section 55 fixedly disposed so as to surround the rotary section 51. The rotary section 51 integrally comprises: a first flange 52 to be bolted to a driving shaft flange 92 of the driving shaft 91; a second flange 54 to be bolted to a driven shaft flange 94 of the driven shaft 93; and a hollow cylinder 53 having the first and second flanges 52 and 54 formed respectively on both edges thereof. The stationary section 55 comprises: an annulus 56 located so as to surround the second flange 54; and a chassis 57 to which the annulus 56 is fixedly attached via attaching members 58.

A primary coil 82 is provided at the inner circumference of the annulus 56, and a secondary coil 83 is provided at the outer circumference of the second flange 54. The primary and secondary coils 82 and 83 in combination constitute a rotary transformer 81, thereby supplying electric power to the rotary section 51.

Torque detectors 61 as strain gauges are provided at the inner circumference of the cylinder 53, a plurality of light emitting elements 67a to 67n, which are adapted to emit light according to an output from the torque detectors 61 thereby outputting an optical signal, are provided at the outer circumference of the second flange 54 so as to be arrayed along the secondary coil 83, a light receiving fiber 71 for receiving the optical signal from the light emitting elements 67a to 67n is provided along the primary coil 82 on the inner circumference of the annulus 56, and optical-electrical signal converters (not shown) for converting the optical signal into an electrical signal are provided at the ends of the light receiving fiber 71.

In the torque measuring device 50, when the driving shaft 91 rotates, the output from the torque detectors 61 is carried via the light emitting elements 67 and the light receiving fiber 71 to the optical-electrical signal converters (not shown) and is detected thereby, thus measuring a rotary torque.

As described above, the conventional torque measuring device 50 is set between the driving shaft powered and the driven shaft loaded and measures a rotary torque between a rotating body and a load without contact with the rotating shaft or the rotating portion of the rotating body. However, oil mist generation is often involved in the measurement of the torque for a rotating body, and if oil mist adheres to the light receiving fiber 71, it may happen that the measuring accuracy is impaired or even the measurement cannot be performed. Thus, the light receiving fiber 71 is required to be cleaned or replaced as appropriate. It is, however, difficult to determine from the outside the extent of oil mist adhering to the light receiving fiber 71, and in some cases it may happen that a periodical maintenance work does not fulfill its purpose. Specifically, it happens that the measurement cannot be appropriately performed already before a scheduled periodical maintenance work thus indicating "too late", or that the light receiving fiber 71 is cleaned or replaced when only a small amount of oil mist adheres thereto thus indicating "too early" and therefore resulting in waste of time and labor.

SUMMARY OF THE INVENTION

The present invention has been made in view of the above circumstance and it is an object of the present invention to provide a torque measuring device for a rotating body, which allows a light receiving fiber to be maintained timely and appropriately.

In order to achieve the object, according to a first aspect of the present invention, a torque measuring device for a rotating body comprises: a rotary section composed of a first flange to be joined to a driving shaft powered, a second flange to be joined to a driven shaft loaded, and a hollow cylinder having the first and second flanges formed respectively on both edges thereof; a plurality of light emitting elements provided at an outer, circumference of the rotary section and adapted to emit light according to an output from torque detectors provided at an inner circumference of the hollow cylinder thereby generating an optical signal; a light receiving fiber adapted to receive the optical signal from the light emitting elements; a plurality of optical-electrical signal converters provided so as to face both end surfaces of the light receiving fiber, and adapted to convert the optical signal into an electrical signal; and a malfunction detector adapted to detect malfunction of the light receiving fiber according to the electrical signal outputted from the optical-electrical signal converters. Consequently, the operating condition of the light receiving fiber can be constantly monitored.

According to a second aspect of the present invention, in the torque measuring device of the first aspect, the malfunction detector compares a direct current value converted from an RMS value of the electrical signal from the optical-electrical signal converters with a predetermined reference value. Consequently, the time to clean or change the light receiving fiber can be announced in a timely manner.

According to a third aspect of the present invention, in the torque measuring device of the first aspect, the malfunction detector compares, in a sequential manner, a direct current value converted from an RMS value of the electrical signal from the optical-electrical signal converters with a plurality of predetermined reference values differing from one another. Consequently, even if a first warning of malfunction of the light receiving fiber is overlooked for some reason, further warnings will come up sequentially, thereby providing a fail-safe feature.

According to a fourth aspect of the present invention, in the torque measuring device of the first aspect, the light receiving fiber receives the optical signal from the light emitting elements through a transparent plate and has its both end portions bent at a right angle. Consequently, the light receiving fiber can be installed efficiently, and also can be maintained in a good working condition merely by cleaning the transparent plate, thereby rendering the maintenance work easier.

According to a fifth aspect of the present invention, in the torque measuring device of the first aspect, the malfunction detector is connected to a warning light, warning buzzer or voice-warning device, or a combination thereof depending on the circumstance. Consequently, the time to clean or change the light receiving fiber can be announced in the most suitable way.

BRIEF DESCRIPTION OF THE DRAWINGS

The above and other features and advantages of the present invention will become apparent from the following description which will be given with reference to the accompanying drawings, in which:

FIG. 2A is a partly cut away and cross-sectioned side view of a torque measuring device for a rotating body according to a first embodiment of the present invention;

FIG. 2B is a partly cut away front view of the torque measuring device of FIG. 2A;

DETAILED DESCRIPTION OF THE PREFERRED EMBODIMENTS

Figures 1A, 1B:
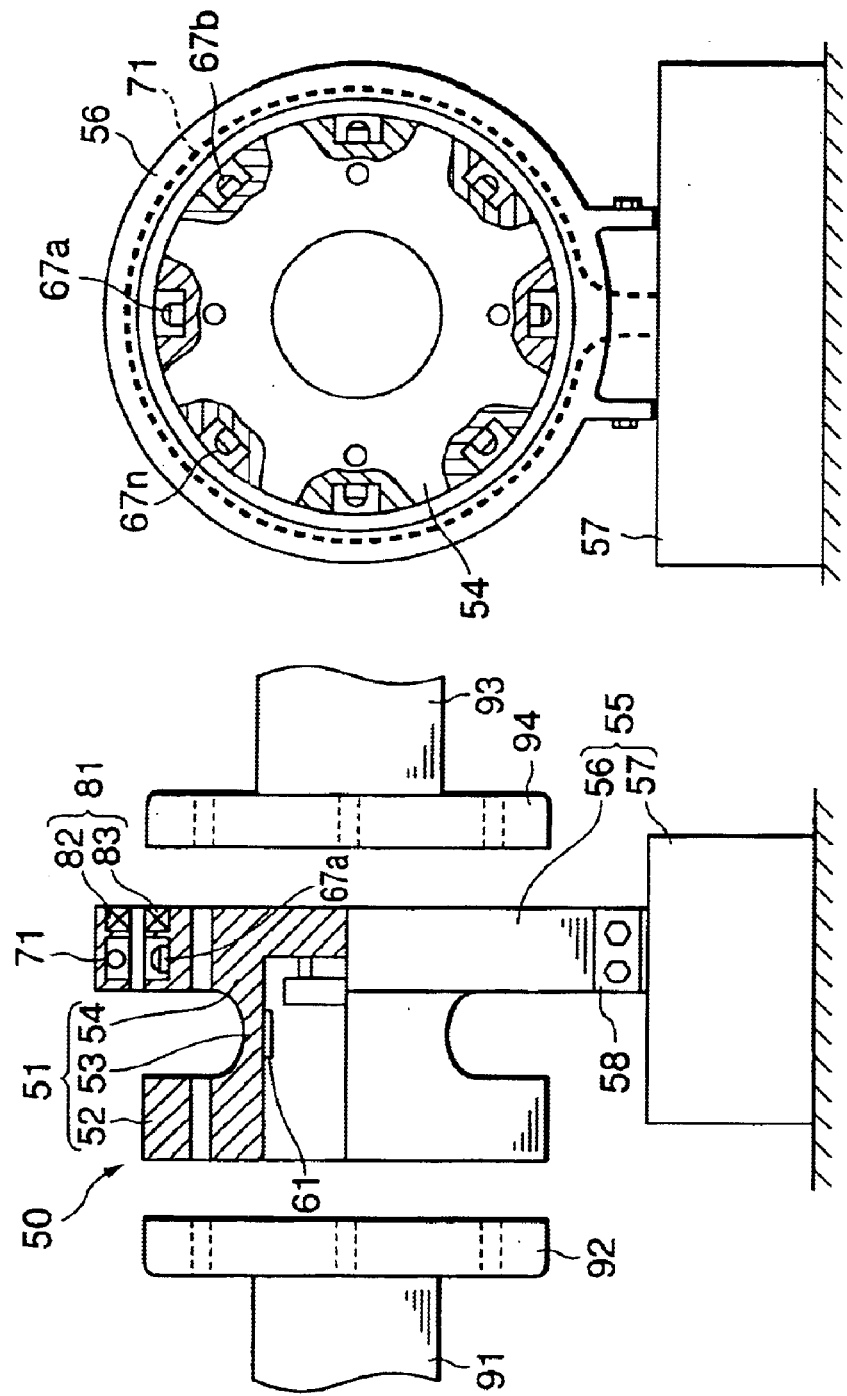
FIG. 1A is a partly cut away and cross-sectioned side view of a conventional torque measuring device for a rotating body.
FIG. 1B is a partly cut away front view of the conventional torque measuring device of FIG. 1A.

Preferred embodiments of the present invention will hereinafter be described with reference to the accompanying drawings.

A first embodiment of the present invention will be described with reference to FIGS. 2A and 2B. As shown in FIGS. 2A and 2B, a torque measuring device for a rotating body 10 according to the first embodiment comprises: a rotary section 11 rotatably disposed between a driving shaft 91 powered and a driven shaft 93 loaded; and a stationary section 15 fixedly disposed so as to surround the rotary section 11. The rotary section 11 integrally comprises: a first flange 12 to be bolted to a driving shaft flange 92 of the driving shaft 91; a second flange 14 to be bolted to a driven shaft flange 94 of the driven shaft 93; and a hollow cylinder 13 having the first and second flanges 12 and 14 formed respectively on both edges thereof. The stationary section 15 comprises: an annulus 16 disposed around the second flange 14; and a chassis 17 to which the annulus 16 is fixedly attached. The first flange 12 is firmly joined to the driving shaft flange 92, and the second flange 14 is firmly joined to the driven shaft flange 94. With the structure described above, when the driving shaft 91 rotates, the cylinder 13 is twisted to be distorted by the driving shaft flange 92 powered and the driven shaft flange 94 loaded.

A primary coil 42 is provided at the inner circumference of the annulus 16, and a secondary coil 43 is provided at the outer circumference of the second flange 14. The primary and secondary coils 42 and 43 in combination constitute a rotary transformer 41, whereby electric power can be supplied to the rotary section 11.

Torque detectors 21 as strain gauges are provided at the inner circumference of the cylinder 13, and a plurality of light emitting elements 27a to 27n adapted to emit light according to an output from the torque detectors 21 are provided at the outer circumference of the second flange 14 and arrayed at a regular interval. A light receiving fiber 31 adapted to receive optical signals from the light emitting elements 27a to 27n is provided at the inner circumference of the annulus 16 along the primary coil 42. First and second optical-electrical signal converters 33a and 33b (hereinafter referred to as signal converter) for detecting an optical signal and converting the optical signal into an electrical signal are provided so as to face respective end surfaces of the light receiving fiber 31 via first and second optical high-pass filters 32a and 32b, respectively. Electrical signals from the signal converters 33a and 33b are sent to a signal receiving and malfunction alarming circuit 30 adapted to receive a signal from the rotary section 11 and to alarm malfunction of the light receiving fiber 31. The signal receiving and malfunction alarming circuit 30 outputs a rotary torque signal and outputs a malfunction alarm signal to a malfunction alarm 30H. On a board 28, electrical components in a transmission circuit 20 (see FIG. 3) of the rotary section 11 are mounted.

Figure 3:
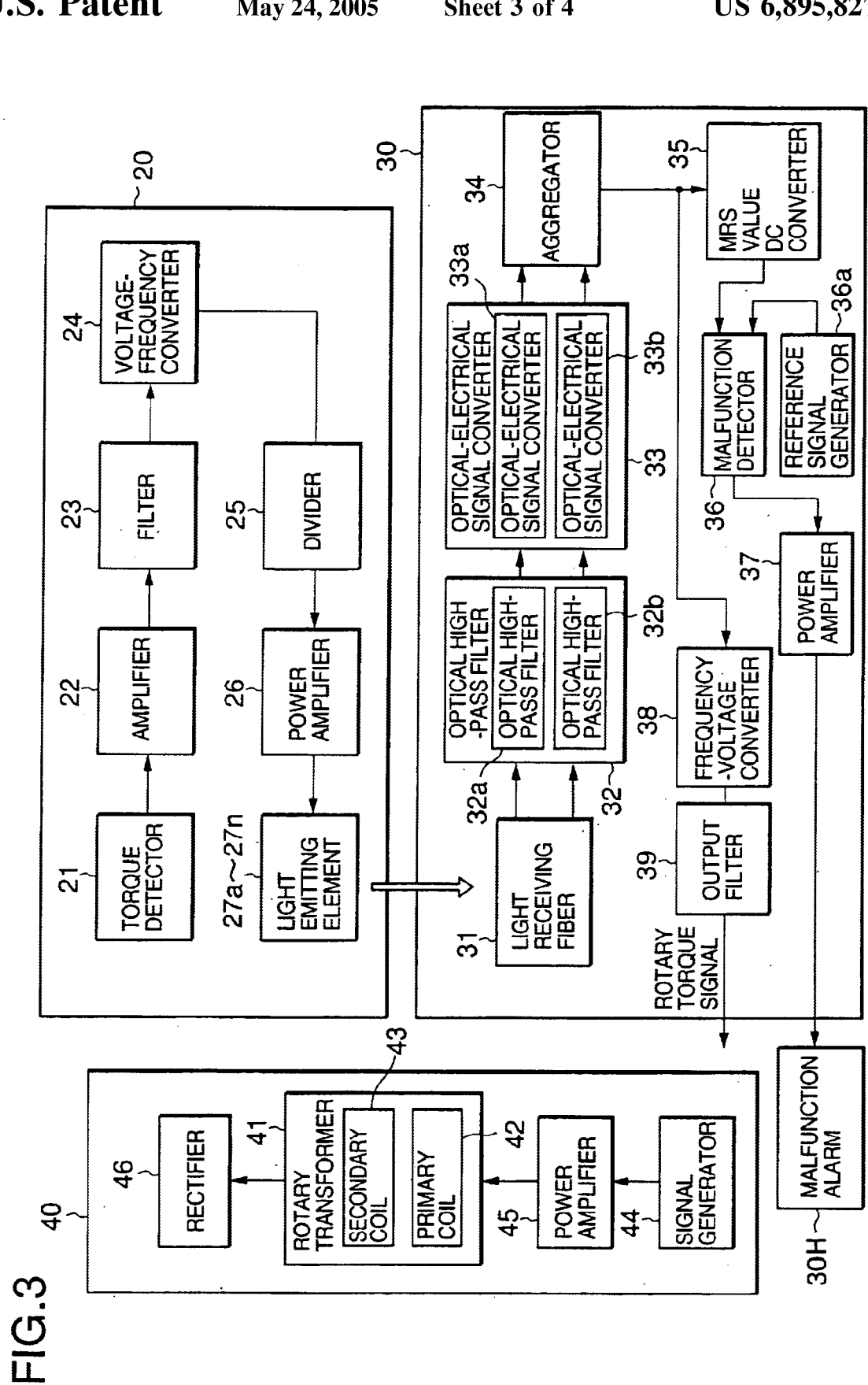
FIG. 3 is block diagram of operation of detecting a rotary torque in the torque measuring device of FIG. 2A.

The operation of detecting a rotary torque in the torque measuring device 10 will hereinafter be described. Strain gauges are adhesively attached on the inner circumferential surface of the cylinder 13 in the circumferential direction and arranged in a Wheatstone bridge thereby forming the aforementioned torque detectors 21 (see FIG. 2A). Referring to FIG. 3, in the aforementioned transmission circuit 20 to transmit a rotary torque signal, an analog signal from the torque detectors 21 is amplified by an amplifier 22, denoised by a filter 23, and converted into a frequency data by a voltage-frequency converter 24. The frequency from the voltage-frequency converter 24 is divided by a divider 25, power-amplified by a power amplifier 26, and sent out as an optical signal from the light emitting elements 27a to 27n to the light receiving fiber 31.

In the signal receiving and malfunction alarming circuit 30, the optical signal from the light emitting elements 27a to 27n is received by the light receiving fiber 31, travels therethrough, and exits from the both ends thereof. Optical signals from the both ends of the light receiving fiber 31 have their outside light, such as fluorescent light, removed by the optical high-pass filters 32a and 32b, and are converted back into frequency data of an electrical signal by the signal converters 33a and 33b. The frequency data of an electrical signal are aggregated by an aggregator 34 and then sent partly to a frequency-voltage converter 38 to be converted thereby into an analog signal and partly to an RMS value DC converter 35. The analog signal from the frequency-voltage converter 38 is denoised by an output filter 39 and turns into a rotary torque signal for rotary torque measurement. On the other hand, the frequency data aggregated by the aggregator 34 and sent to the RMS value DC converter 35 has its RMS value converted thereby into a direct current and outputted to a malfunction detector 36. The malfunction detector 36 compares an output value from the RMS value DC converter 35 with a predetermined reference value outputted from a reference signal generator 36a, and if the comparison therebetween determines that the output value from the RMS value DC converter 35 is below the reference value from the reference signal generator 36a, a malfunction signal is sent to the aforementioned malfunction alarm 30H via a power-amplifier 37. The malfunction alarm 30H then announces it is time to clean the light receiving fiber 31. If the output value from the RMS value DC converter 35 does not exceed the reference value from the reference signal generator 36a after the light receiving fiber 31 is cleaned according to the announcement, then the light receiving fiber 31 must be replaced with a new one.

A power supply circuit 40 includes a signal generator 44 and a power amplifier 45 at the stationary section 15. The signal generator 44 generates a predetermined frequency signal, which is power-amplified by a power amplifier 45, sent to a rectifier 46 at the rotary section 11 via a rotary transformer 41, converted into a direct current by the rectifier 46 and is supplied as electrical power for the transmission circuit 20 of the rotary section 11.

Thus, in the torque measuring, device 10 according to the first embodiment of the present invention, when the driving shaft 91 rotates, the torque signal from the torque detectors 21 is carried through the light emitting elements 27a to 27n to the signal converter 33 and detected there, whereby a rotary torque is measured, and at the same time a timely and appropriate maintenance work to clean or change the light receiving fiber 31 is assured.

In this connection, the output value from the reference signal generator 36a, which is compared with the output value from the RMS value DC converter 35, may be split into a plurality of predetermined reference values differing from one another, whereby a malfunction alarm signal is sent to the malfunction alarm 30H via the power amplifier 37 every time when the malfunction detector 36 determines that the output value from the RMS value DC converter 35 falls below each of the predetermined reference values. In this way, even if a first malfunction warning is overlooked for some reason, further warnings are raised in a sequential manner to ensure the light receiving fiber 31 is appropriately cleaned or replaced before it is too late. Furthermore, the malfunction alarm 30H can be a warning light, warning buzzer, voice-warning device or the like or a combination thereof for the most suitable way of warning.

Figure 4:
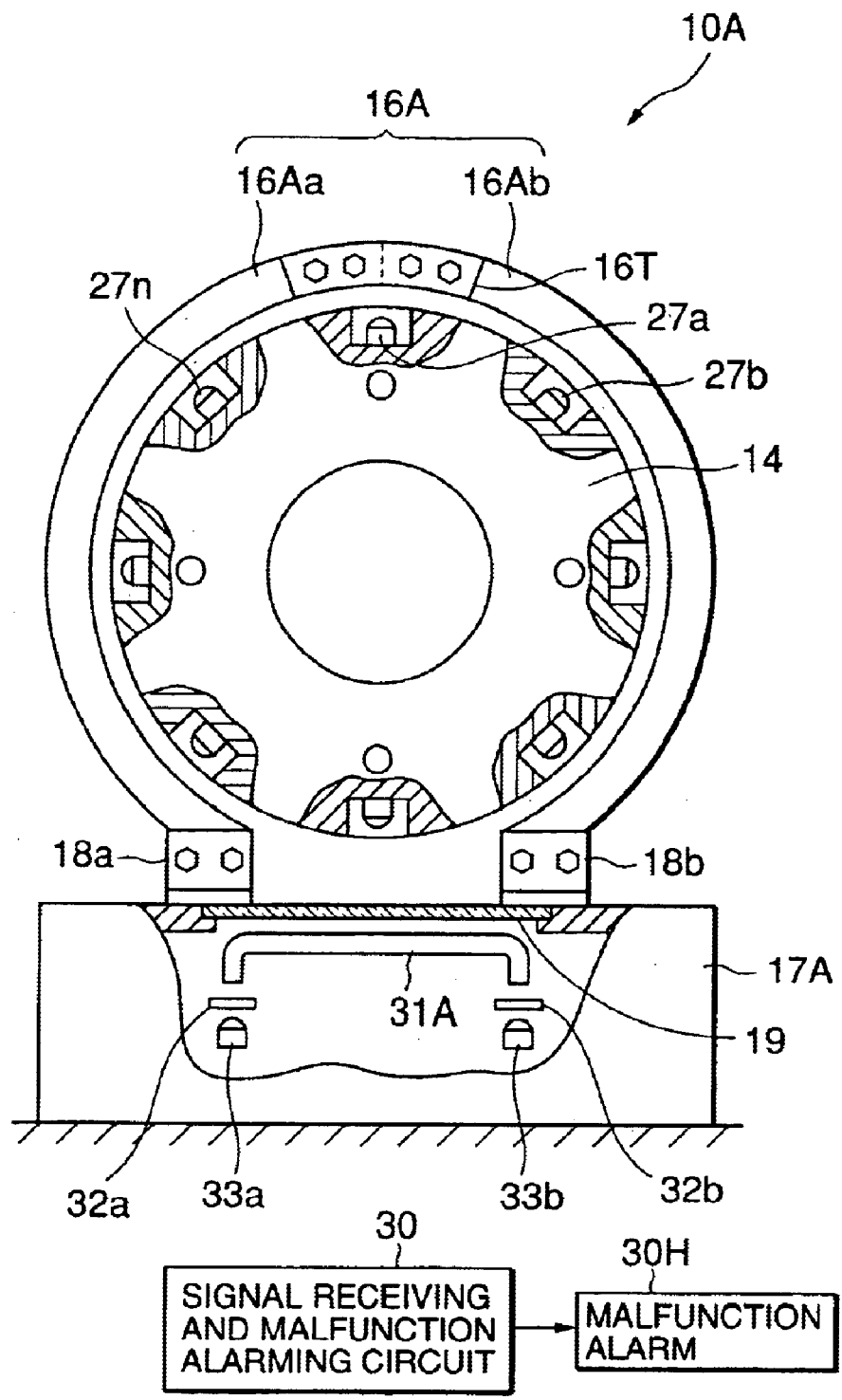
FIG. 4 is a partly cut away front view of a torque measuring device for a rotating body according to a second embodiment of the present invention.

A second embodiment of the present invention will hereinafter be described with reference to FIG. 4. As shown in FIG. 4, in a torque measuring device 10A according to the second embodiment, an annulus 16A composed of two semi-annulus sections and located to surround the second flange 14 is attached to a chassis 17A via attaching members 18a and 18b. The annulus 16A comprises semi-annulus sections 16Aa and 16Ab and a connecting member 16T. One ends (upper side in the figure) of the semi-annulus sections 16Aa and 16Ab are detachably connected to each other via the connecting member 16T, and the other ends (lower side in the figure) thereof are not connected to each other but insulatively attached to the chassis 17A. The annulus 16A thus structured, when formed of a conductive material, functions as the aforementioned primary coil 42.

The chassis 17A houses a light receiving fiber 31A for receiving optical signals from the light emitting elements 27a to 27n. The light receiving fiber 31A has its both end portions bent at a right angle for efficient installation inside the chassis 17A. The signal converters 33a and 33b are disposed so as to face respective end surfaces of the light receiving fiber 31A via the optical high-pass filters 32a and 32b, respectively, and a transparent plate 19 is fixedly attached to the chassis 17A so as to be disposed along the light receiving portion of the light receiving fiber 31A.

With the above described differences from the torque measuring device 10 according to the first embodiment, the torque measuring device 10A according to the second embodiment enables the annulus 16A to be easily dismantled and also the light receiving condition of the light receiving fiber 31A to be restored only by cleaning the transparent plate 19, as well as the maintenance work timing is timely and appropriately announced in the same manner as in the torque measuring device 10. This feature further eases the maintenance work of the light receiving fiber.

What is claimed is:

1. A torque measuring device for a rotating body, comprising:

a rotary section composed of a first flange to be joined to a driving shaft powered, a second flange to be joined to a driven shaft loaded, and a hollow cylinder having the first and second flanges formed respectively on both edges thereof;

a plurality of light emitting elements provided at an outer circumference of the rotary section and functioning to emit light according to an output from torque detectors provided at an inner circumference of the hollow cylinder thereby generating an optical signal;

a light receiving fiber to receive the optical signal from the light emitting elements;

a plurality of optical-electrical signal converters provided so as to face both end surfaces of the light receiving fiber, and functioning to convert the optical signal into an electrical signal; and a malfunction detector to detect malfunction of the light receiving fiber according to the electrical signal outputted from the optical-electrical signal converters.

2. A torque measuring device according to claim 1, wherein the malfunction detector compares a direct current value converted from an RMS value of the electrical signal from the optical-electrical signal converters with a predetermined reference value.

3. A torque measuring device according to claim 1, wherein the malfunction detector compares, in a sequential manner, a direct current value converted from an RMS value of the electrical signal from the optical-electrical signal converters with a plurality of predetermined reference values differing from one another.

4. A torque measuring device according to claim 1, wherein the light receiving fiber receives the optical signal from the light emitting elements thorough a transparent plate and has its both end portions bent at a right angle.

5. A torque measuring device according to claim 1, wherein the malfunction detector is connected to at least one of a warning light, warning buzzer and voice-warning device.

* * * * *